April 23, 1935.  A. A. KUCHER  1,998,461
APPARATUS FOR REPRODUCING SOUND
Filed March 17, 1930   4 Sheets-Sheet 1
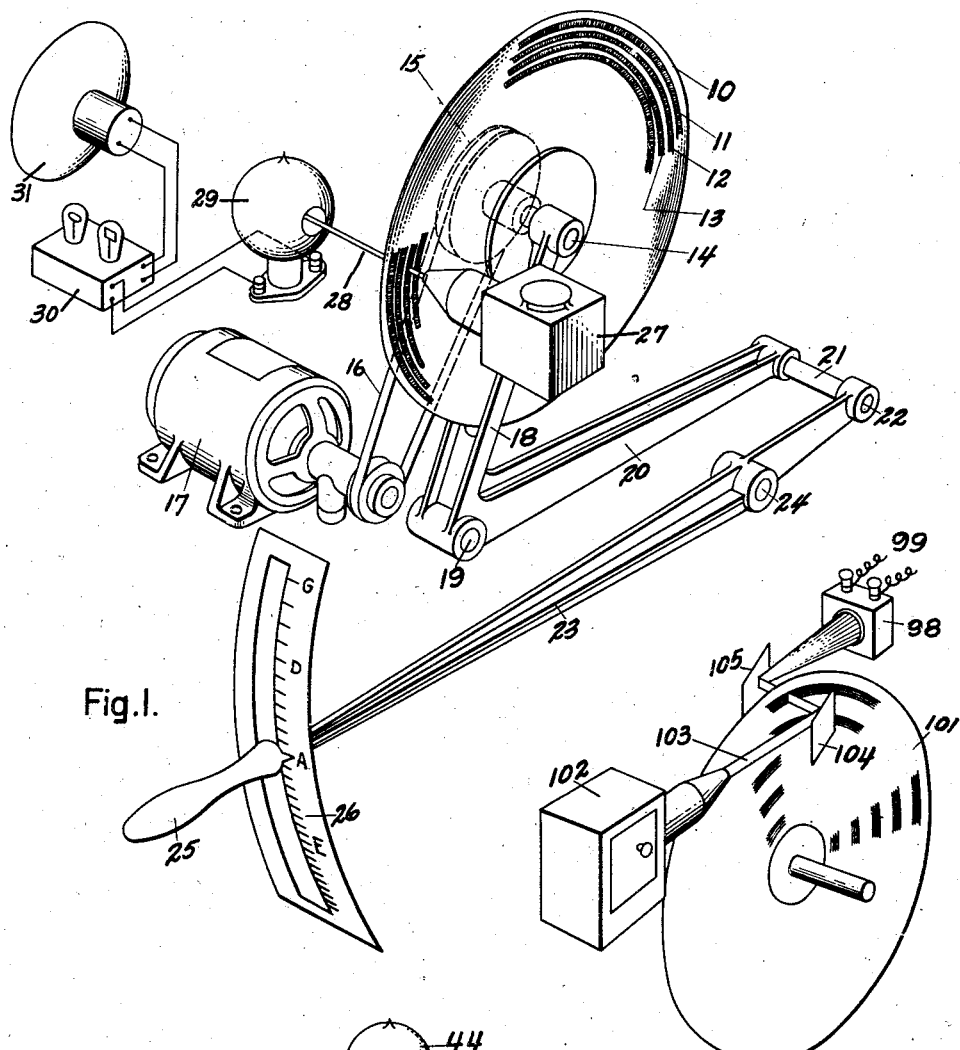
Fig.1.
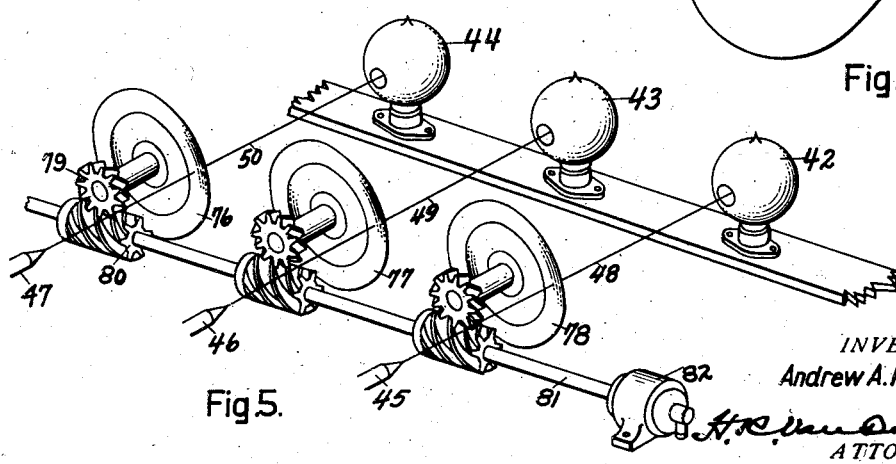
Fig.8.
Fig.5.
INVENTOR
Andrew A. Kucher.
ATTORNEY April 23, 1935.  A. A. KUCHER  1,998,461
APPARATUS FOR REPRODUCING SOUND
Filed March 17, 1930   4 Sheets-Sheet 2

INVENTOR
Andrew A. Kucher
BY
ATTORNEY

April 23, 1935.　　　A. A. KUCHER　　　1,998,461
APPARATUS FOR REPRODUCING SOUND
Filed March 17, 1930　　　4 Sheets-Sheet 3

INVENTOR
Andrew A. Kucher
BY
ATTORNEY

April 23, 1935. A. A. KUCHER 1,998,461
APPARATUS FOR REPRODUCING SOUND
Filed March 17, 1930  4 Sheets—Sheet 4

INVENTOR
Andrew A. Kucher.
BY
ATTORNEY

Patented Apr. 23, 1935

1,998,461

UNITED STATES PATENT OFFICE 1,998,461

APPARATUS FOR REPRODUCING SOUND

Andrew A. Kucher, New York, N. Y.

Application March 17, 1930, Serial No. 436,264

18 Claims. (Cl. 84—1)

This invention relates to an apparatus for reproducing sound and has for its object the method whereby the tonal quality and individuality of artists and the particular instruments played by them may be recorded and reproduced by others, without adhering to the original sequence of tones produced by said artists; that is to say the originating artist produces a series of perfect tones or notes, which may be thereafter reproduced by others, less skilled, and in sequence of any musical composition.

Another object is to produce a simple and cheap musical instrument, the tones and other musical characteristics of which are those of some master instrument such as a world famous organ or the like, the individual tones of which have been previously recorded and which may be reproduced by an operator in the sequence of any musical composition desired.

Other objects will be apparent from a perusal of the following specification and the annexed drawings:

Figure 1 is a diagrammatic view of an apparatus for reproducing sound embodying this invention, using disc records with sound tracks photographed thereon;

Figure 5 shows an arrangement wherein a plurality of circular record discs similar to those shown in Figure 1 are used in combination;

Figure 8 is an enlarged view of a disc record and one arrangement of its related apparatus.

Figure 2:
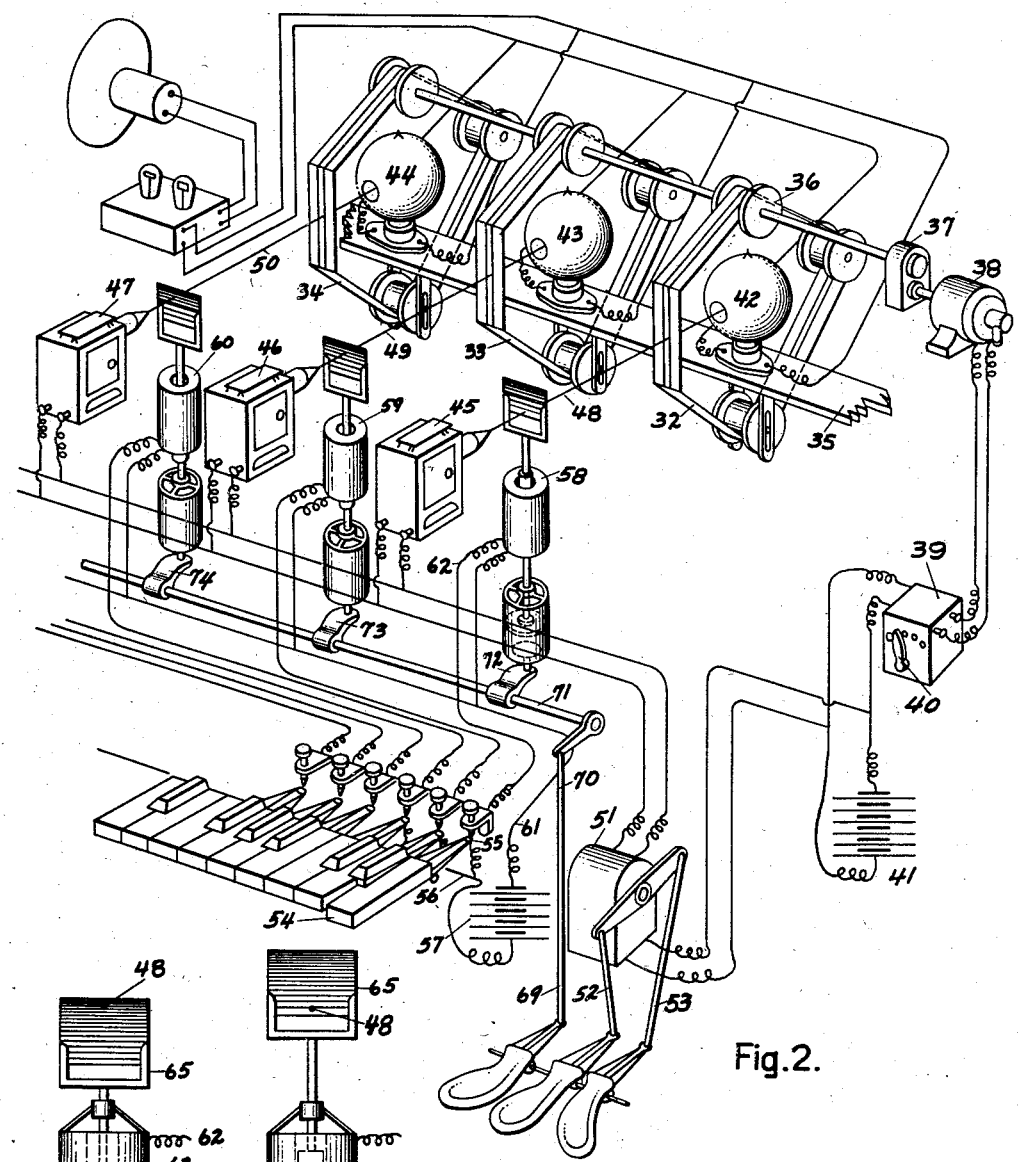
Figure 2 is a diagrammatic view of a reproducing apparatus using endless films having photographic sound tracks thereon.

Known musical instruments may be divided into three classes:

(A) Instruments requiring a skilled player to operate such as a piano, a violin, or organ. Obviously, the tonal quality of the music produced cannot be better than the quality of the instrument and the skill of the player to manipulate it.

(B) Instruments mechanically operated such as player pianos and the like. While these may be operated by anyone, or by power, the musical compositions cannot be varied, as a separate record is necessary for each composition. The tonal quality of these instruments in each case is the tonal quality of the particular instrument.

(C) Instruments such as a phonograph, which will reproduce a record of another instrument with a certain fidelity of tone and quality but which requires a separate record for each composition.

The present invention differs from all of the foregoing as it enables the user to obtain the quality of tone of a perfect instrument in the hands of a skilled artist while at the same time the user (who may be an ordinary performer) may combine the tones originally produced by the artist to produce any known composition.

By way of illustration this method and apparatus will be described as applied to violin playing, although it will be obvious it can be used for recording and reproducing with any device producing sounds or for combining any desired number of devices to produce the effect of an orchestra or the like. Vocal selections can be played in combination with the appropriate instrumental accompaniment.

The first step in this method is to produce the sound record. This may be of any form and type. It may be a disc with indentations therein like an ordinary phonograph or a paper or other disc having the record made thereon in any manner and adapted to be reproduced therefrom by suitable means or a wire as used in the Poulson Telegraphone may be used. For the sake of illustration, one record is here shown of the type in which the sound is recorded photographically on a disc or film, and another record is shown of the phonograph type.

As there are several known methods of recording sound photographically and by means of indentations on the record and as the exact method used is immaterial, it will not be described in detail. The record may be a disc of film material indicated by the numeral 10. The first step is to produce a predetermined sequence of sounds such as a chromatic scale.

The second step is to record these sounds on separate tracks 11, 12, 13. Each track constitutes a single note or tone. The recording is done by some noted artist, using a violin of the highest quality. The record will now contain a plurality of tone tracks having all of the qualities inherent in the artist and instrument that produces them.

The third step is to provide a method of reproducing these notes or tones in any sequence and at any volume, under the control of the operator. This is done by mounting the record 10 upon a bearing 14 so that it may be revolved by any suitable means such as the pulley 15, belt 16 and electric motor 17, the latter revolving the record continuously at uniform speed. The motor may be controlled in any known manner to insure uniformity of speed which is important, or a synchronous motor may be used when the device is to be used on alternating current.

Where a direct current motor is used, one example of speed control may consist of a friction-controlled centrifugal governor, such as is shown diagrammatically in Figure 1, as 17a.

Bearing 14 is supported by arm 18 having a fixed support forming a bearing 19. Arm 18 connects to arm 20, the outer end of which supports pin 21 engaging a bearing 22 in arm 23 which moves about a fixed support forming a bearing 24. A handle 25 is fixed to arm 23 and a scale 26 is placed adjacent this handle. By moving handle 25 the rotating record is moved across the beam 28. Scale 26 may have suitable indicia thereon corresponding to the several notes or tones corresponding to the sound tracks 11, 12, 13.

There are several known methods of taking the sound tracks off the record and reproducing them as sound. The following is illustrative of one method but any arrangement may be used:

A source of light such as the electric exciting lamp 27 with suitable condenser system, is fixedly mounted on one side of the record 10 so that a beam of light indicated by the numeral 28 will pass through the sound tracks on the record and the emergent beam will impinge upon a light sensitive cell 29. This cell is connected to a suitable amplifier 30 and to a sound reproducing device such as the loud speaker 31. This apparatus taken together may be termed a reproducing means, or reproducer.

The apparatus being connected for operation and the record 10 revolved at a uniform speed, by moving handle 25, the record 10 will be laterally shifted so that the various sound tracks 11, 12, 13, will be brought into the beam of light 28 and the light sensitive cell 29 actuated accordingly. This will, by reason of the amplifier 30 and loud speaker 31, faithfully reproduce the notes recorded on the several sound tracks as the original recording artist produced them on the original instrument on which they were produced, but the sequence in which these sounds are produced may be varied at the will of the operator.

The arrangement of the tone tracks on the record is important. The preferred arrangement is to record the tone having the highest frequency upon the longest track such as track 11, Figure 1. This enables the frequency waves to be spread out as much as possible. The lower or base notes of lower frequency are recorded upon the inner tracks such as 14, Figure 1, as their frequency is not so great and good reproduction of them is secured with a shorter linear track without crowding the record. This condition naturally enables the record to be produced with a full musical scale starting with the lowest note on the innermost sound track and progressing in chromatic or regular musical order to the highest note on the outermost track.

This arrangement greatly simplifies the shifting mechanism and permits of regularly and progressively moving the record and reproducing device in relation to each other, as the coaxial sound tracks may be evenly spaced apart.

With the foregoing arrangements any musical composition may be played at will depending upon the skill of the operator. However, whatever is reproduced will have the tonal characteristics of the master violinist and the superb quality of the master's violin, regardless of the lack of technique of the operator, who need only be able to play the notes in their proper sequence and duration to produce a musical composition.

In Figure 2 is shown diagrammatically an instrument provided with a keyboard of musical scale character like an ordinary piano or organ keyboard, but obviously this instrument is not limited to the reproduction of piano or organ tones as it can be used to "play" or reproduce the tones of any instrument, depending upon the records used.

In the embodiment illustrated, the records in suitable number to produce the notes or tones desired may be strips of ordinary 16 millimeter photographic film arranged as endless belts 32, 33, 34 passing over suitable pulleys mounted on a frame 35. The upper pulleys, one of which is shown at 36, are connected through suitable gearing 37 to the electric motor 38 or any suitable source of power: foot power or a spring motor may be used.

The motor 38 is regulated by a rheostat 39, the handle 40 of which is within easy reach of the operator at the keyboard. A source of current such as the battery 41 is provided for operating the motor and for other purposes as hereinafter described.

The film belts 32, 33, 34 may contain one or more sound tracks and a simple mechanism (not shown) be provided for laterally shifting the whole bank of film belts to permit of bringing these extra tracks (not shown) into the range of the light beams hereinafter described. A preferred arrangement would be three sound tracks per film, for instance: violin, cello and piano of the same note.

Suitably positioned, back of each film is a light sensitive cell 42, 43, 44. Positioned in front of each film are the exciting lamps 45, 46, 47, beams of light 48, 49, 50, from which, pass through their associated films and impinge upon the corresponding light sensitive cells. These exciting lamps may be connected in circuit with a suitable rheostat 51 connected to the current supply 41. By means of pedals 52, 53 or other means operating the rheostat, the lights may be brightened or dimmed, thereby giving the effect of the "loud" and "soft" pedals and constituting a volume control. Another method of effecting control is to apply a shunt resistance to the amplifier circuit, and control this resistance by means of pedals 52—53.

A suitable bank of keys, one of which is shown depressed at 54, is provided, each key adapted to close an associated contact 55. The key contacts are connected to a common conductor 56 connected to a source of current 57 (which may be the same source as 41). The remaining contacts on each key are connected to a control magnet 58, 59, 60 and one side of all said magnets is connected via common conductor 61 to the current source 57. Thus each key is in series with one of the magnets and a source of current.

Figures 3, 4:
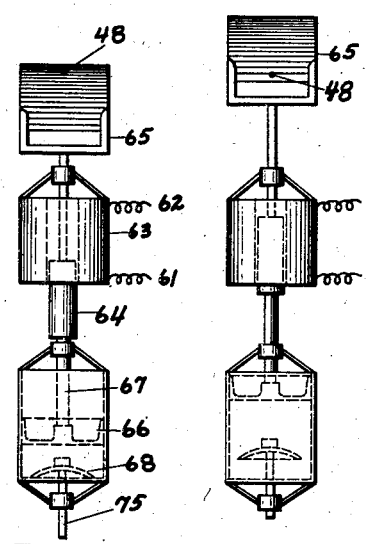
Figures 3 and 4 are views of the control magnets for the reproducing system shown in Figure 2.

The control magnets are shown in detail in Figures 3 and 4. Figure 3 shows the magnet in the "at rest" or normal position, and Figure 4 when energized. The control valve 68 in these figures is shown in Figure 3 as closed and Figure 4 as open; but the normal position of this valve is open as shown in Figure 4 permitting the free action of piston 66.

When a key (54) is pressed thereby closing its contacts 55, current flows from 57 via 56 to 55 via conductor 62 to the winding 63 of the magnet thereby energizing the armature or core 64 which is drawn up into the winding as shown in dotted lines, Figure 4.

The upper end of core 64 carries a shutter 65 graduated from opaque to transparent. Normally this shutter cuts off the beam of light 48 from lamps 59 to its corresponding cell 42 but when the shutter is raised, as shown in Figure 4, then the light beam is free to pass therethrough. This arrangement permits of a gradual inflection or production of the note or tone.

A piston 66 in a dash-pot 67 is also raised by the core 64, valve 68 opening inwardly to the dash-pot to permit this.

Pedal 69 provided with rods 70 and 71 as shown, operate a plurality of fingers 72, 73, 74, one for each control valve 68. A stem 75 projects from each valve 68 in each control unit and engages its adjacent finger 72. The valves are normally retained open to permit the immediate drop of the shutter after the corresponding key has been struck. By pressing pedal 69, the valves may be partially or completely closed thereby lengthening the period that the tones are reproduced. By releasing pedal 69 the valves are again opened, the shutters drop and the tone ceases.

The degree of compression on pedal 69 will regulate the distance the shutter 65 will fall and thereby regulate the volume of the sound of that note, or the length of time it will be audible.

In Figure 5 is shown an arrangement wherein a plurality of circular record discs 76, 77 and 78 similar to the record 10 of Figure 1 are used in combination, the same as the film strips 32, 33 and 34 in Figure 2. In this arrangement each record or rotating tone track disc is provided with a gear, one of which is shown at 79, which meshes with the worm 80 on shaft 81 driven by an electric motor 82. The arrangement in all other respects is the same as that shown in Figure 2.

Figure 6:
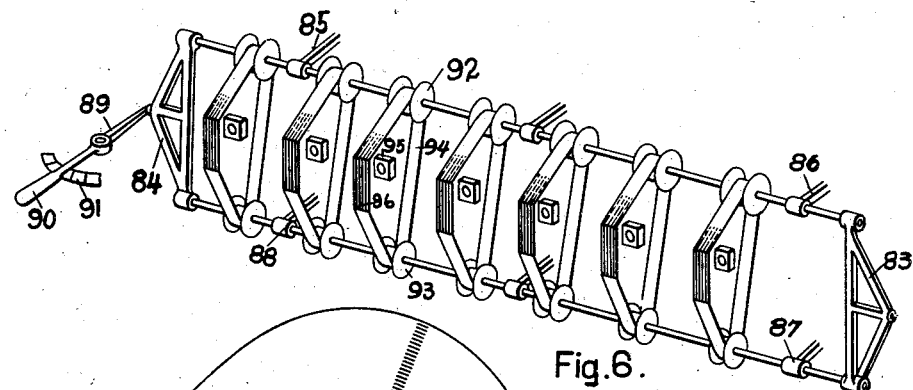
Figure 6 shows a means for laterally moving the film supporting frame work shown in Figure 2.

In Figure 6 is shown means for laterally moving the frame work supporting the film strips or records carrying the tone tracks. A frame comprising the members 83, 84 is adapted to slide in supports 85, 86, 87 and 88. This frame is laterally movable by means of the lever 89 connected to the handle 90 which may be moved over a graduated scale 91. This frame carries the pulleys 92, 93, supporting the film 94. (Only one set of pulleys and film is described. There may be any desired number.)

The light sensitive cells, one of which is shown at 95, are mounted in proper relation to the bank of movable films so that the films containing the sound tracks will be shifted in the paths of the light rays when the frame is laterally shifted. The light rays are shown as passing through a light track 96 on the film 94.

By providing the shifting frame just described it is possible to record a plurality of tone tracks on each film and then, by merely moving the handle 90, switch from one set of tone tracks to another. For example, the films may have recorded thereon a series of piano, violin and saxophone tones or scales and, by moving the handle 90 the complete instrument can be instantly prepared to "play" any one of these instruments.

Figure 7:
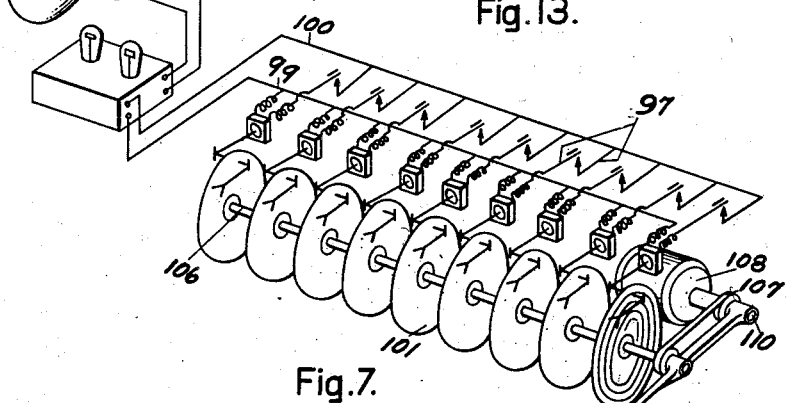
Figure 7 shows an embodiment of the invention in which the key circuits are simplified.

Figure 7 shows a simplified embodiment of the invention in which the key circuits are somewhat simplified. Here the keys which are designated by the numeral 54 in Figure 2 are shown diagrammatically, one set of contacts being indicated by the numeral 97. Each key is connected to its respective light sensitive cell, one of which is shown at 98. All of these light sensitive cells are connected to a common wire 99. Another common wire 100 is connected to one side of all of the keys or contacts. When a type of light sensitive cell is used that furnishes its own current, a source of energy such as a battery is unnecessary and the common wires 99, 100 are connected to a suitable amplifier and loud speaker. If other types of cells are used, the necessary batteries may be included in circuit therewith.

Figure 8 is an enlarged view of one record and its related apparatus showing a preferred arrangement of the light beam through one of the records indicated by the numeral 101. The light source 102 projects a beam of light 103 parallel to the surface of the record. This beam is reflected by a mirror 104 through the record 101, the emergent beam is received on a second mirror 105 and reflected into the light sensitive cell 98. The light sources are omitted in Figure 7 for the sake of clarity but it will be understood that there is a common light source for each one of the records or a single light source for all. Obviously however, none of the light sensitive cells will operate in connection with the circuit wires 99 and 100 unless a corresponding key is pressed. Therefore, while all of the light sensitive cells are operating, the only tones that will be impressed upon the circuit 99, 100 are those related to the respective keys which are depressed.

All of the records, Figure 7, are arranged on a common shaft 106 which is driven by any suitable means such as the belt 107 connected to the driving pulley of an electric motor 108. The various parts are suitably mounted in a frame, (not shown) and by means of the handle 109 the whole bank of records may be shifted around the fulcrum 110 thereby interposing the various "piano", "violin", "cello", "saxophone" sound tracks within the path of the light beam 103 so that by setting pointer 111 on the proper scale 112 which scale coincides in position with the respective sound tracks on the record, any desired set of tones may be reproduced.

Figure 9:
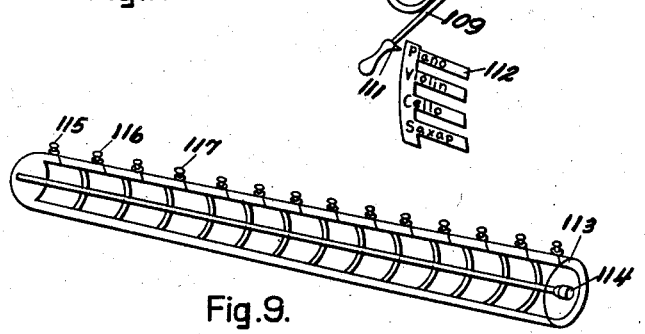
Figure 9 shows a light sensitive cell of a type especially suited for use with the apparatus shown in some of the other figures.

In Figure 9 is shown a light sensitive cell of a type especially suited for use with the instruments shown in any of the preceding figures. This cell comprises a suitable casing 13 in which is mounted a common electrode plate or anode 114 and a plurality of separate electrodes or plates, three of which are shown at 115, 116, 117. These plates are suitably insulated from each other. The casing encloses all the electrodes and may be vacuumized, gas filled or filled with liquid, depending upon the type of cell desired. By this arrangement a single cell will take the place of the plurality of cells shown in the preceding figures, it being understood that the individual electrode 115, 116 and 117 are connected to the individual keys or contacts shown in Figure 7 and that the common electrode or anode 114 would be connected to the common wire 99, Figure 7.

Figure 10:
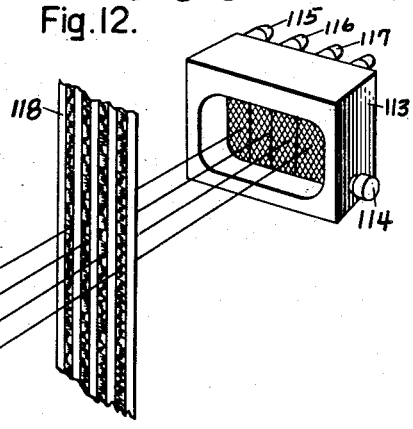
Figure 10 shows an embodiment of the cell, Figure 9, in an apparatus using a film.
Figure 10:
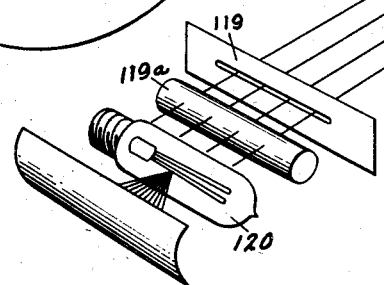

Figure 10 shows an embodiment of the cell shown in Figure 9. The film or record 118 has recorded on it a plurality of tone tracks. A light slit 119, and lens 119ª are provided and the broad beam of light from the lamp 120 passes through this slit and through the light record, finally impinging upon the individual electrodes 115, 116 and 117 of the cell, these being connected in circuit as shown in Figure 7.

Figure 12:
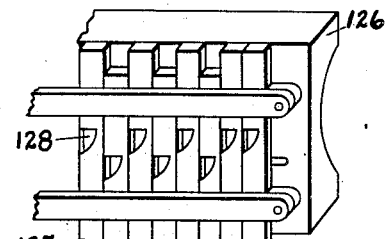
Figure 12 shows a light valve.
Figure 11:
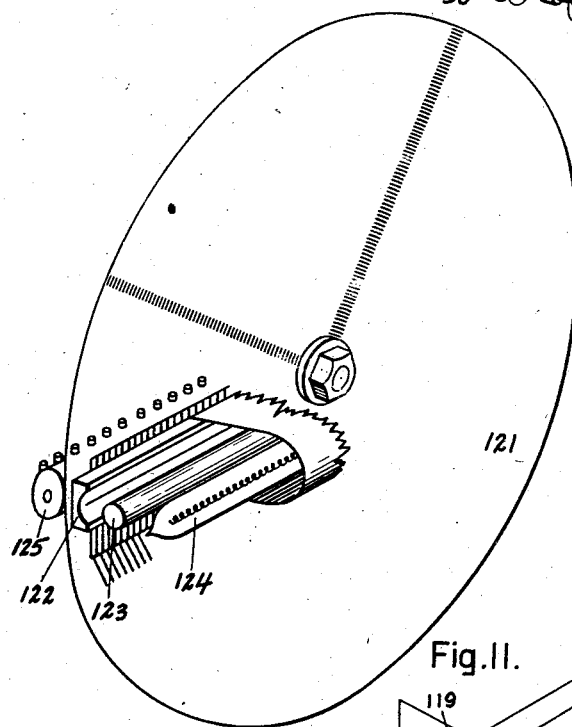
Figure 11 shows a modification of the single disc machine.

Figures 11 and 12 show a further modification of the invention in which a single disc 121 may have a complete musical scale of any desired instrument recorded thereon in the form of a plurality of narrow coaxial rings or tracks. The light slit 122, lens 123 and light source 124 cover this entire scale. The light passing through the slit and through the record 121 falls on the light sensitive cell 125, the common terminal of which connects to wire 96, Figure 7, and the individual terminals of which connect to the individual key or contacts 97, Figure 7.

Between the light slit 122 and the record 121 may be placed a plurality of light valves as shown in Figure 12, one valve for each tone track. This arrangement may consist of a suitable support in which is movably mounted the light valves which may comprise bar members, one of which is shown at 127 and which are vertically movable. The bottom of these bars may be mechanically connected to suitable key mechanism such as the same keys as operate the cell circuits, or a separate set of keys, or foot pedals. In each bar is an aperture of the shape indicated at 128 to gradually restrict the light beam so that, during the opening and closing of the valve the cutting of the beam of light and consequent tone production will not be too abrupt. This also enables the volume of any tone to be regulated.

Figure 13:
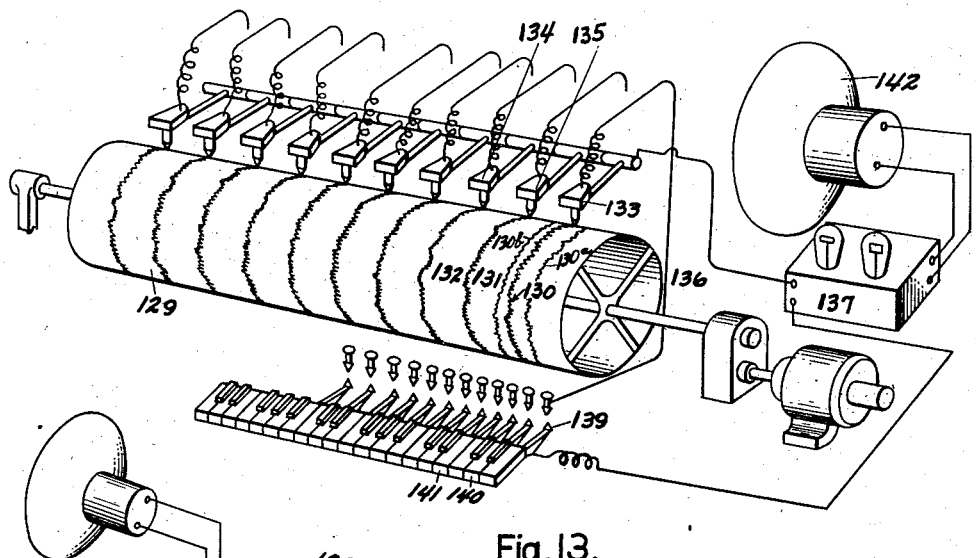
Figure 13 shows a complete apparatus using a cylindrical record.

This invention may be carried out with any suitable form of mechanically recorded sound records as well as those previously described, and in Figure 13 is shown a cylindrical record drum 129 having thereon a plurality of sound tracks, three of which are shown at 130, 131 and 132. These tracks are impressed on the record in any known manner and each track contains one note or tone.

A separate reproducer is provided for each sound track and these reproducers are preferably of the electrical "pick up" variety and are shown at 133, 134 and 135. A common wire 136 connects one side of all of these reproducers with one side of the usual amplifier 137, the other side of which is connected via conductor 138 to one side of all of the keys or contacts, a separate key or contact being provided for each reproducer and therefore for each tone track. These keys are shown at 139, 140, 141, and by depressing any one of these keys the corresponding reproducer is placed in circuit, the tone track connected to said reproducer is thereby made available and by means of the amplifier 137 this tone or note is made audible by the loud speaker 142.

The drum 129 may be laterally shifted to cause the reproducers to shift from one track to another. For instance reproducer 133 would, by shifting the drum, engage tracks 130ᵃ or 130ᵇ as well as track 130.

By the arrangement just described the use of light sensitive cells, light sources and the other equipment incident to the reproduction of light recorded sound records is eliminated.

In illustrating the various forms of this invention the mechanism has been shown only in a diagrammatic manner and no attempt has been made to show the various parts in their proper relative proportions. However, the invention is not limited to the particular forms shown and described, as it will be apparent that other modifications therein may be made without departing from the scope of the invention as set forth in the appended claims.

I claim:

1. In an apparatus of the class described, a flat moving sound record, means for producing a beam of light and projecting same through said record, and electromagnetic means including a manually controlled key and a graduated screen for varying the intensity of the light beam passing to said record.

2. In an apparatus of the class described, a flat sound record, reproducing means associated therewith including a beam of light, magnetically controlled means for varying the intensity of the light beam, and means for releasing said last means after the actuation thereof.

3. In an apparatus of the class described, a flat sound record, reproducing means associated therewith including a beam of light, a graduated shutter in said beam, means for operating said shutter, and independent means for releasing said shutter after the same has operated.

4. In an apparatus of the class described, a sound record, reproducing means associated therewith including a beam of light, and a magnetically operated shutter in said beam having an air controlled dash-pot.

5. In an apparatus of the class described, a sound record, reproducing means associated therewith including a beam of light, a shutter in said beam, a piston connected to said shutter, and a dash-pot for the piston.

6. In an apparatus of the class described including a flexible sound record, a control device comprising a magnet, a shutter controlled thereby, said shutter adapted to control a light beam, and means independent of said magnet for returning said shutter to a normal position.

7. In an apparatus of the class described including a flexible sound record, control devices having a plurality of magnetically actuated shutters and a plurality of keys arranged in the sequence of a musical scale for actuating said shutters and independent means under control of an operator for releasing the shutters after the same have been actuated.

8. In an apparatus of the class described including a flexible sound record, a plurality of tone tracks, means for projecting beams of light, a plurality of light valves in said beams, means for actuating said valves, and means for delaying the return of said valves to a normal position.

9. In an apparatus of the class described including a flexible sound record, means for controlling the volume of the reproduced sound including a bar member having an aperture adapted to restrict a beam of light in accordance with the distance an actuating key associated with said bar is depressed.

10. In an apparatus of the class described, a plurality of light sources, pedal controlled means for varying the intensity of the light emitted therefrom, and means including a pedal for bringing the intensity of the light sources back to normal.

11. In an apparatus of the class described, a plurality of endless film belts, a plurality of light sources adapted to project a beam of a light through said belts, and a plurality of light sensitive means positioned between the flat faces of said belt and in line with the beams of light passing through said belts.

12. In an apparatus of the class described, a film having sound tracks thereon, a source of light associated with said record and adapted to pass through all said sound tracks, a light sensitive cell associated with said record and having an anode and a plurality of electrodes corresponding to the number of sound tracks on said record, and means for selectively connecting said electrodes to a reproducer.

13. In an apparatus of the class described, a movable film having sound tracks thereon, reproducing means, means for varying the motion of said film, and means including two pedals operating retrograde for varying the action of said reproducing means.

14. In a sound reproducing apparatus, a record having sound tracks circumferentially disposed thereon, a source of light, means for producing a plurality of light beams from said source, means for passing said beams through said tracks in any desired order, a light sensitive cell adapted to cooperate with all of said beams, an amplifier and reproducer associated therewith, and means including two pedals operating retrograde for varying the brilliancy of said light source thereby varying the volume of the reproduced sounds.

15. In a sound reproducing apparatus, a record comprising an endless belt having substantially parallel sound tracks thereon, a source of light, means for producing a plurality of light beams from said source, means for passing the beams through said tracks, a light sensitive cell adapted to cooperate with all of said beams, an amplifier and reproducer, means for selectively connecting different portions of said cell to the amplifier, and means including pedals for varying the brilliancy of said light source, thereby varying the volume of the reproduced sounds.

16. In a sound reproducing apparatus, a record having sound tracks circumferentially disposed thereon, a source of light, means for producing a plurality of light beams from said source, means for passing the beams through said tracks, a light sensitive cell having a common anode and a plurality of cathodes each adapted to cooperate with one of said beams, an amplifier and reproducer associated therewith, and means for varying the brilliancy of said light source, thereby varying the volume of the reproduced sounds.

17. In a sound reproducing apparatus, a record comprising an endless belt having a plurality of sound tracks thereon, a source of light, means for producing a plurality of light beams from said source, means for passing the beams through said tracks, a light sensitive cell having a common anode and a plurality of cathodes each adapted to cooperate with one of the emergent beams, an amplifier and reproducer associated therewith, means for selectively connecting said cathodes to the amplifier, and means for varying the brilliancy of said light source, thereby varying the volume of the reproduced sounds due to the connecting of said cathodes.

18. In a sound reproducing apparatus, a record comprising an endless belt having a plurality of sound tracks thereon, a source of light, means for producing a plurality of light beams from said source, means for passing the beams through said tracks, a light sensitive cell having a common anode and a plurality of cathodes each adapted to cooperate with one of the emergent beams, an amplifier and reproducer associated therewith, and means including a keyboard for connecting and disconnecting said cathodes to and from said amplifier in any desired order.

ANDREW A. KUCHER.